(12) United States Patent
Miyamura et al.

(10) Patent No.: US 11,561,703 B2
(45) Date of Patent: Jan. 24, 2023

(54) ADAPTIVE TAPE CALIBRATION CRITERIA BY NUMBER OF DEAD TRACKS

(71) Applicant: International Business Machines Corporation, Armonk, NY (US)

(72) Inventors: Tsuyoshi Miyamura, Yokohama (JP); Keisuke Tanaka, Tokyo (JP); Ernest Stewart Gale, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 17/172,141

(22) Filed: Feb. 10, 2021

(65) Prior Publication Data

US 2022/0253223 A1    Aug. 11, 2022

(51) Int. Cl.
*G11B 20/18* (2006.01)
*G06F 3/06* (2006.01)

(52) U.S. Cl.
CPC .......... *G06F 3/0619* (2013.01); *G06F 3/0616* (2013.01); *G06F 3/0629* (2013.01); *G06F 3/0653* (2013.01); *G06F 3/0659* (2013.01); *G06F 3/0682* (2013.01)

(58) Field of Classification Search
CPC .... G06F 3/0619; G06F 3/0629; G06F 3/0653; G06F 3/0659
USPC ......................................................... 711/154
See application file for complete search history.

(56) References Cited

U.S. PATENT DOCUMENTS

| 3,838,400 A | 9/1974 | Meadows | |
| 9,640,208 B2 * | 5/2017 | Poorman | G11B 5/584 |
| 10,600,443 B2 * | 3/2020 | Butt | G11B 20/1866 |
| 11,189,316 B1 * | 11/2021 | Miyamura | G11B 19/048 |
| 2007/0014042 A1 | 1/2007 | Nylander-Hill | |
| 2012/0036318 A1 * | 2/2012 | Cideciyan | G06F 3/0619 711/111 |
| 2015/0015982 A1 * | 1/2015 | Cideciyan | G11C 29/00 360/40 |
| 2019/0189156 A1 * | 6/2019 | Butt | G11B 5/00813 |
| 2019/0311741 A1 * | 10/2019 | Cideciyan | G11B 20/1886 |
| 2020/0051591 A1 * | 2/2020 | Yamamoto | G11B 27/30 |

FOREIGN PATENT DOCUMENTS

| JP | 2002150515 A | 5/2002 |
| JP | 2004508974 A | 3/2004 |

OTHER PUBLICATIONS

International Search Report and Written Opinion, International Application No. PCT/EP2022/053025, International Filing Date Feb. 8, 2022.

* cited by examiner

*Primary Examiner* — Mohamed M Gebril
(74) *Attorney, Agent, or Firm* — Gilbert Harmon, Jr.

(57) ABSTRACT

In an approach to adaptive tape calibration criteria based on the number of dead tracks, the number of rewrite occurrences for each dead track on a tape drive is determined. Responsive to detecting that a head is in a dead track state, the number of dead tracks is stored on the tape drive. A calibration threshold is determined, where the calibration threshold includes the number of dead track rewrites and the calibration reference value for a specific tape drive type. Responsive to the number of rewrite occurrences exceeding the calibration threshold while writing a data set, a calibration of the tape drive.

25 Claims, 8 Drawing Sheets

ADAPTIVE TAPE CALIBRATION CRITERIA BY NUMBER OF DEAD TRACKS

BACKGROUND

The present invention relates generally to the field of tape-based data storage, and more particularly to adaptive tape calibration criteria based on the number of dead tracks.

Magnetic tape data storage is a system for storing digital information on magnetic tape using digital recording. Today, most magnetic tape is packaged in cartridges and cassettes. Since much of the data recorded today does not need to be accessed immediately, magnetic tape is a preferable solution for long-term data storage. Although the technology may seem outdated, it has advanced tremendously since its introduction. The first commercial digital-tape storage system stored roughly a megabyte of data on one reel of tape, but modern cartridges hold 15 terabytes or more, and the capacity is constantly increasing.

The reason magnetic tape drives are still in use today, especially as an offline data backup is because of long archival stability and very favorable unit costs. Although data stored on tape cannot be accessed as quickly as data stored on hard drives, the storage is more energy efficient and reliable. Magnetic tape storage is also more cost effective, typically as little as one-sixth the cost to store the same amount of data on a disk. And while the rate for increasing capacity for disc drives is decreasing, the capacity for storage on magnetic tape still increases approximately 33 percent each year.

On a tape drive, a channel is the process of converting a digital signal into an analog signal and outputting the analog signal from the data track to a tape or reading the analog signal from the tape and converting it into a digital signal. Depending on the state of each head element, the channel determines the optimum values of various parameters based on the amount of current flowing through the head in order to optimize the signal input and output. The values are stored in the tape drive vital product data (VPD), which is the non-volatile memory of the tape drive, for each head. When reading or writing data to or from tape, the values saved in the VPD are set in the registers of the components that control the channel.

These channel parameters are adjusted at the time of initial configuration immediately after shipment of the tape drive, or when it is necessary to reconfigure the values due to deterioration of the head or the state of the tape media. This adjustment is called calibration. Calibration is a procedure to adjust the channel settings of each track. When performing calibration, various parameters are optimized by moving to an area on the tape media where user data is not written and repeatedly writing and reading data until the optimal values are determined. For example, during calibration data is written to the tape while changing the voltage/amplitude level of each track, then the signal to noise ratio is measured as the data is read back. Calibration then selects the channel parameters from the best result of each track independently. This calibration process takes time, which reduces the transfer rate of the tape drive since new data cannot be written while the calibration is being performed.

An increasing number of users are concerned about the decrease in transfer rate due to calibration. These users want a tape drive that does not perform calibration when it is unnecessary. One such case where calibration is unnecessary is when calibration is attempting to reduce rewrites which are actually caused by dead tracks, since calibration cannot fix a dead track. The problem addressed by the present invention is to avoid calibration of the tape drive, which reduces tape throughput, when the rewrites are caused by dead tracks.

SUMMARY

Embodiments of the present invention include a computer-implemented method, computer program product, and system for adaptive tape calibration criteria based on the number of dead tracks. In a first embodiment, the number of rewrite occurrences for each dead track on a tape drive is determined. Responsive to detecting that a head is in a dead track state, the number of dead tracks is stored on the tape drive. A calibration threshold is determined, where the calibration threshold includes the number of dead track rewrites and the calibration reference value for the specific tape drive type. Responsive to the number of rewrite occurrences exceeding the calibration threshold while writing a data set, a calibration of the tape drive is performed.

Embodiments of the present invention include a computer-implemented method and computer program product for adaptive tape calibration criteria based on the number of dead tracks. In a second embodiment, a number of rewrite occurrences is determined for each dead track on a tape drive. Responsive to detecting that a head is in a dead track state, the number of dead tracks is stored on the tape drive. A first threshold and a second threshold are determined, where the first threshold includes the number of dead track rewrites and a calibration reference value for a specific tape drive type, and further where the second threshold contains the number of calibration rewrites and the calibration reference value for the specific tape drive type. Responsive to the number of rewrite occurrences exceeding the first threshold while writing a data set, a calibration of the tape drive is performed. Responsive to the number of rewrite occurrences exceeding the second threshold while writing the data set, a refresh of the tape drive is performed.

DETAILED DESCRIPTION

Figure 1:
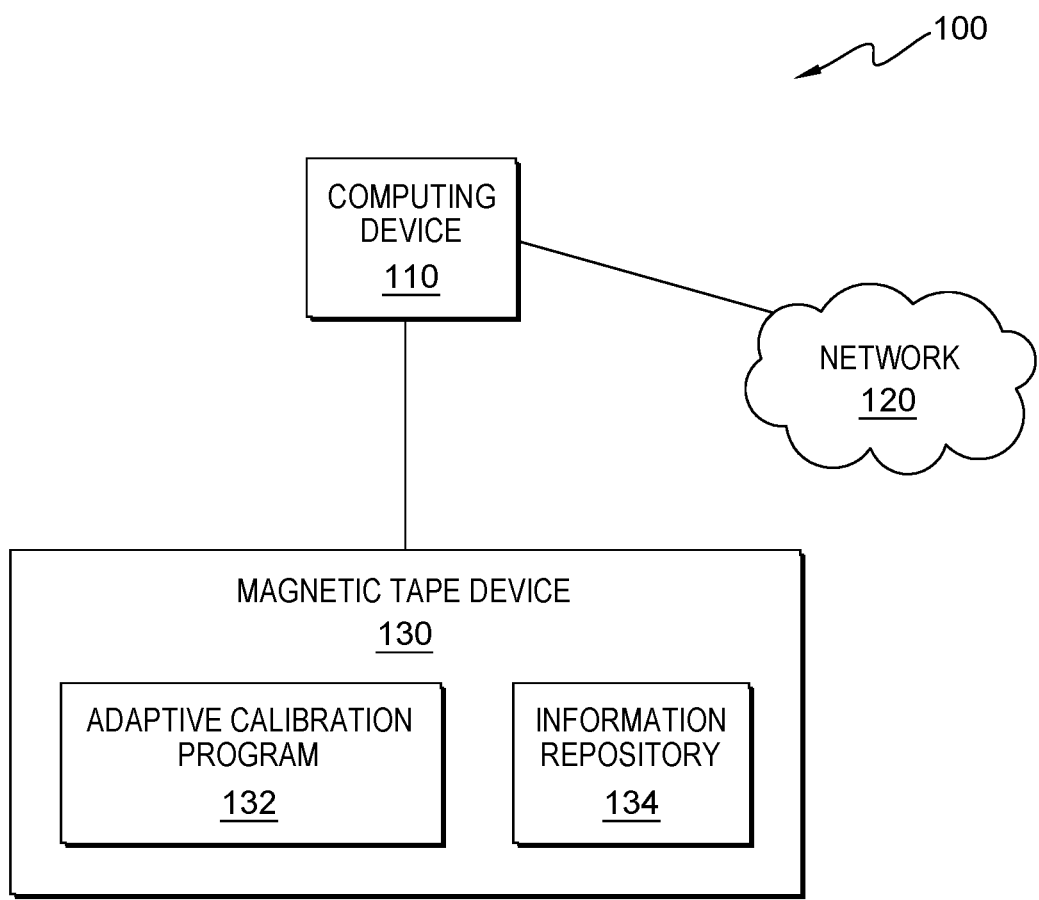
FIG. 1 is a functional block diagram illustrating a distributed data processing environment, in accordance with an embodiment of the present invention.

In a tape drive, a writing head and a reading head are arranged in pairs, and at the time of writing, immediately after writing data on the tape media, the reading head reads back the data from the tape. If the read data does not match the written data, the drive writes the unwritten data with another head. The mechanism to write again is called a rewrite. While moving the tape and writing data, the tape drive counts the frequency of rewrites and determines whether calibration is necessary. When the tape approaches the calibration area after it has been determined that calibration is necessary, calibration is performed to optimize the channel parameters.

In the present invention, rewriting by a head that is no longer functioning properly is examined. The state in which the head element has stopped functioning is called a dead track. A typical Linear Tape-Open (LTO) tape drive writes redundant data with error correction code (ECC) between the written data to enable reading back data written by a drive with a certain number of dead track heads. However, if there is a dead track, the frequency of rewrites will always increase at a constant rate. Since this is not taken into consideration, even if rewrite occurs due to a small amount of debris, the frequency of rewrite occurrences exceeds the threshold value and calibration is performed, which causes a decrease in transfer rate. For dead track heads, adjusting the channel parameters does not reduce the frequency of rewrites, which means that unnecessary calibrations may be performed.

Embodiments of the present invention describe a mechanism for changing the reference value for calibration caused by rewrites to take into consideration the number of rewrites caused by dead tracks when they are detected.

A data set is the smallest unit that a tape drive writes to tape. In an example of a typical tape drive, e.g., an LTO tape drive with 32 head elements, the data set consists of 192 Codeword Interleave (CWI) set data units, which are written simultaneously using the 32 heads. In an embodiment, for each specific type of tape drive product, the frequency of rewrites for each number of dead tracks is measured in advance. Every time the data set is written, or the tape drive is calibrated, the tape drive checks whether any heads have dead tracks and, if dead tracks are detected, that information is stored in the non-volatile memory of the tape drive.

In an embodiment, when deciding whether to perform calibration, the frequency of rewrite occurrences corresponding to the number of dead track heads is added to the reference value of the number of rewrites required to perform calibration. In an embodiment, whether to perform calibration is determined by comparing the reference value of rewrites including the number of rewrites due to dead tracks with the frequency of rewrites occurring during actual writing.

An example follows. For this example, an LTO tape drive was confirmed to have one head in a dead track state. In the example LTO drive, one data set consists of 192 CWI sets. In this example, one track in a forward direction is in a state of dead track and tracks in a backward direction are in an extremely good state.

As a result of measurement, it is determined that 1.44 CWI sets per data set on average were rewritten in the backward direction. In contrast, 9.24 CWI sets per data set on average were rewritten in the forward direction. From the above data, it is calculated that the number of occurrences of rewrite with a head in a dead track state is about 7.8 CWI sets of rewrites per data set when there is one head in a dead track state (9.24 CWI sets for a dead track minus 1.44 CWI sets for a good track). Therefore, 4% of CWI sets are rewritten per data set, i.e., 7.8 rewrites for a dead track divided by 192 CWI sets in one data set. Note that this value is greater than the value for one head. If a track is dead on a tape drive with 32 tracks, then 1 track/32 tracks=3.125% of the tracks are not working. So typically, the drive rewrites the 3.125% of the CWI sets that were not correctly written to the tape. But the drive uses all tracks for rewrite which means that the dead track is used again for the rewrite operation. Therefore, the number of CWI sets for rewrite is larger than 3.125%, and 4% is used.

Therefore, in order to determine whether calibration should be performed on this drive, 7.8 is added in advance to the reference value for rewrite only in the forward direction, and the reference value thus obtained is compared to the number of occurrences of rewrite per data set during actual writing. In the example LTO drive, we determine that the reference value is 9, and therefore the reference value in the forward direction is set to 16.8 (7.8 for dead track, plus the reference value of 9 for this specific drive type), but the reference value in the backward direction remains at 9.

Now consider an example of the existing art that does not correct a reference value by considering the number of dead tracks, in which a drive typically incurs an average of only 1.3 rewrites per data set not counting rewrites resulting from dead tracks. Since the dead track will incur, on average, 7.8 rewrites caused by dead tracks, the average rewrites plus the dead track rewrites exceeds the reference value of 9, which will result in a calibration being performed. Therefore, since the vast majority of the rewrites are caused by the dead tracks which cannot be corrected by calibration, an unnecessary calibration will be performed, reducing the tape drive throughput.

In embodiments of the present invention, the reference value is changed to take into consideration a head in a dead track state, thereby preventing calibration until the number of occurrences of rewrite exceeds 16.8. In other words, calibration is only performed when it is really necessary. In the example above, in which the drive on average incurs only 1.3 rewrites per data set, even when including the rewrites caused by dead tracks (7.8 on average), no unnecessary calibration will be performed, since the number of rewrites does not exceed the new threshold of 16.8.

FIG. 1 is a functional block diagram illustrating a distributed data processing environment, generally designated 100, suitable for operation of adaptive calibration program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120 and magnetic tape device 130 connected to computing device 110. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, magnetic tape device 130 includes adaptive calibration program 132. In an embodiment, adaptive calibration program 132 is a program, application, or subprogram of a larger program for adaptive tape calibration criteria based on the number of dead tracks.

In an embodiment, magnetic tape device 130 includes information repository 134. In an embodiment, information repository 134 may be managed by adaptive calibration program 132. In an alternate embodiment, information repository 134 may be managed by the operating system of the device, alone, or together with, adaptive calibration program 132. Information repository 134 is a data repository that can store, gather, compare, and/or combine information. In some embodiments, information repository 134 is located externally to magnetic tape device 130 and accessed through a communication network, such as network 120. In some embodiments, information repository 134 is stored on magnetic tape device 130. In some embodiments, information repository 134 may reside on another computing device (not shown), provided that information repository 134 is accessible by magnetic tape device 130. Information repository 134 includes, but is not limited to, tape drive configuration data, tape drive error data, tape cartridge error data, tape calibration data, storage system configuration data, filesystem data, and other data that is received by adaptive calibration program 132 from one or more sources, and data that is created by adaptive calibration program 132.

Information repository 134 may be implemented using any volatile or non-volatile storage media for storing information, as known in the art. Similarly, information repository 134 may be implemented with any suitable storage architecture known in the art, such as a relational database, an object-oriented database, or one or more tables.

Figure 2:
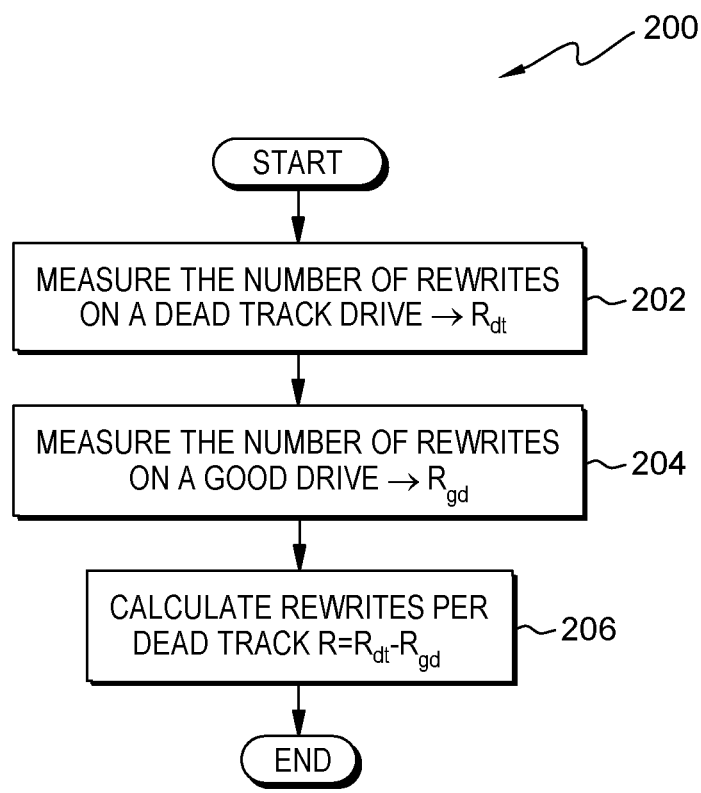
FIG. 2 is a flowchart depicting operational steps performed by the adaptive calibration program for the preparation procedure, where the number of occurrences of retry is determined during a write operation on a drive where one head has a dead track, on a magnetic tape device within the distributed data processing environment of FIG. 1, in accordance with an embodiment of the present invention.

FIG. 2 is a flowchart depicting operational steps performed by adaptive calibration program 132 for the preparation procedure, where the number of occurrences of retry is determined during a write operation on a drive where one head has a dead track, on a magnetic tape device within the distributed data processing environment of FIG. 1, in accordance with an embodiment of the present invention. In an alternative embodiment, the steps of workflow 200 may be performed by any other program while working with adaptive calibration program 132. In an embodiment, adaptive calibration program 132 measures the number of rewrites on a drive with a dead track in one head. In an embodiment, adaptive calibration program 132 measures the number of rewrites on a good drive, i.e., a drive with no dead tracks. In an embodiment, adaptive calibration program 132 calculates the rewrites, R, specifically caused by a dead track.

It should be appreciated that embodiments of the present invention provide at least for the preparation procedure of adaptive calibration program 132, where the number of occurrences of retry is determined during a write operation on a drive where one head has a dead track. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Adaptive calibration program 132 measures the number of rewrites on a dead track drive→$R_{dt}$ (step 202). In an embodiment, adaptive calibration program 132 measures the number of rewrites on a drive with a dead track in one head. In an embodiment, adaptive calibration program 132 stores this value in $R_{dt}$, where dt represents the track number of the dead track in the specific head.

Adaptive calibration program 132 measures the number of rewrites on a good drive→$R_{gd}$ (step 204). In an embodiment, 132 adaptive calibration program 132 measures the number of rewrites on a good drive, i.e., a drive with no dead tracks. In an embodiment, adaptive calibration program 132 stores this value in $R_{gd}$, where gd represents a good drive, i.e., a drive with no dead tracks.

Adaptive calibration program 132 calculate rewrites per dead track (step 206). In an embodiment, adaptive calibration program 132 calculates the rewrites, R, specifically caused by a dead track using formula (1).

$$R = R_{dt} - R_{gd} \quad (1)$$

In an embodiment, adaptive calibration program 132 then ends for this cycle.

It should be appreciated that the embodiment described in FIG. 2 is just one simple method to calculate the number of rewrites attributed to dead tracks where the number of rewrites increases linearly with the number of dead tracks. In another embodiment, the number of rewrites may not increase linearly. In this alternate embodiment, the number of rewrites on a drive with a dead track, $R_{dt}$, is measured for j dead tracks is measured and stored in a structure $R_{dt}(j)$. In this embodiment, adaptive calibration program 132 calculates the rewrites, R, specifically caused by a dead track, substituting the value $R_{dt}(j)$ for the value of $R_{dt}$ of formula (1), using formula (1a).

$$R=R_{dt}(j)-R_{gd} \quad (1a)$$

Figure 3:
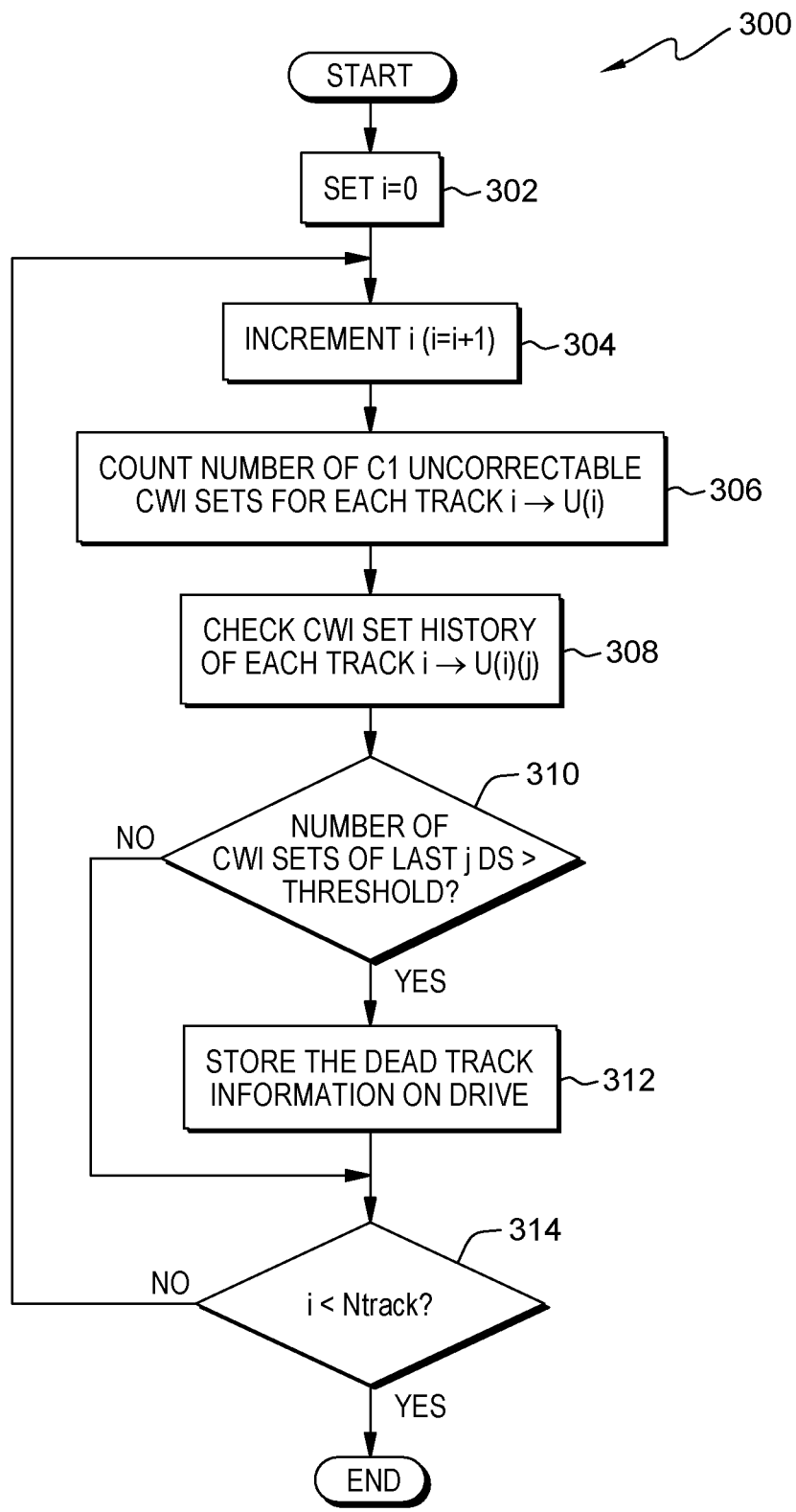
FIG. 3 is a flowchart depicting operational steps performed by the adaptive calibration program for storing information on a dead track during a write operation, on a magnetic tape device within the distributed data processing environment of FIG. 1, in accordance with an embodiment of the present invention.

FIG. 3 is a flowchart depicting operational steps performed by adaptive calibration program 132 for storing information on a dead track during a write operation, on a magnetic tape device within the distributed data processing environment of FIG. 1, in accordance with an embodiment of the present invention. In an alternative embodiment, the steps of workflow 300 may be performed by any other program while working with adaptive calibration program 132. In an embodiment, adaptive calibration program 132 initializes a counter, i, to zero. In an embodiment, adaptive calibration program 132 increments the track counter i to address the next track in the tape drive. In an embodiment, adaptive calibration program 132 counts the number of ECC-protected data segments, or CWI sets, which have errors that occurred in the i-th track that are uncorrectable by C1, one of the error correction functions used in the tape drive. In an embodiment, adaptive calibration program 132 stores the j-th history of U(i), i.e., the U(i) obtained during writing the prior j data sets, in U(i)(j). In an embodiment, adaptive calibration program 132 determines if the number of uncorrectable CWI sets in the last j datasets exceeds a predetermined threshold. In an embodiment, if adaptive calibration program 132 determines that the number of uncorrectable CWI sets in the last j datasets exceeds a predetermined threshold, then adaptive calibration program 132 determines that the tape head is in a dead track state during the write operation. In an embodiment, adaptive calibration program 132 determines if the last track on the tape drive has been checked, i.e., if i is less than the number of tracks in the drive. In an embodiment, if adaptive calibration program 132 determines that the last track on the tape drive has been checked then adaptive calibration program 132 ends for this cycle.

It should be appreciated that embodiments of the present invention provide at least for operational steps performed by adaptive calibration program 112 for storing information on a dead track during a write operation. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Adaptive calibration program 132 sets i=0 (step 302). In an embodiment, adaptive calibration program 132 initializes a counter, i, to zero. In an embodiment, adaptive calibration program 132 uses this counter to step through the algorithm of FIG. 3 once for each track in the specific tape drive under analysis.

Adaptive calibration program 132 increments i (i=i+1) (step 304). In an embodiment, adaptive calibration program 132 increments the track counter i to address the next track in the tape drive.

Adaptive calibration program 132 counts the number of C1 uncorrectable Codeword Interleave Sets for each track i→U(i) (step 306). In an embodiment, adaptive calibration program 132 counts the number of ECC-protected data segments, or CWI sets, which have errors that occurred in the i-th track that are uncorrectable by C1, one of the error correction functions used in the tape drive. Typically, C1 is a highly efficient Reed-Solomon Error Correcting Code. C1 is designed to detect and correct media errors per channel. In an embodiment, adaptive calibration program 132 stores this count in U(i).

Adaptive calibration program 132 checks the CWI Set history of each track i→U(i)(j) (step 308). In an embodiment, adaptive calibration program 132 stores the j-th history of U(i), i.e., the U(i) obtained during writing the prior j data sets, in U(i)(j). In an embodiment, since the number of rewrites may increase when the tape surface is damaged, such as scratched, in order to avoid the effect of the tape surface damage, the drive checks the rewrites for a certain length. Therefore, the number of history sets checked by adaptive calibration program 132 is a variable, j, that can be adjusted based on the history of the drive. In an embodiment, j is a system default. In another embodiment, j is received from a user or system administrator. In yet another embodiment, j is specific to the specific drive or drive type.

Adaptive calibration program 132 determines if the number of CWI sets of the last j datasets>threshold (decision block 310). In an embodiment, adaptive calibration program 132 counts the number of data sets out of the last j data sets whose CWI sets exceed a predetermined threshold. In an embodiment, if adaptive calibration program 132 determines that the number of data sets out of the last j data sets whose CWI sets exceed a predetermined threshold does not itself exceed a second threshold ("no" branch, decision block 310), then adaptive calibration program 132 proceeds to decision block 314 to check the next track. In an embodiment, if adaptive calibration program 132 determines that the number of data sets out of the last j data sets whose CWI sets exceed a predetermined threshold does itself exceed a second threshold ("yes" branch, decision block 310), then adaptive calibration program 132 proceeds to step 312 to store the dead track information.

Adaptive calibration program 132 stores the dead track information on the drive (step 312). In an embodiment, if adaptive calibration program 132 determines that the number of uncorrectable CWI sets in the last j datasets exceeds a predetermined threshold, then adaptive calibration program 132 determines that the tape head is in a dead track state during the write operation. In an embodiment, adaptive calibration program 132 then stores the head and track information in the tape drive, e.g., the main memory or the VPD.

Adaptive calibration program 132 determines if i<$N_{track}$ (decision block 314). In an embodiment, adaptive calibration program 132 determines if there are still tracks to be checked on the tape drive, i.e., if i is less than the number of tracks in the drive, then there are still tracks remaining to be checked. In an embodiment, if adaptive calibration program 132 determines that there are still tracks to be checked on the tape drive ("yes" branch, decision block 314), then adaptive calibration program 132 returns to step 304 to check the next track. In an embodiment, if adaptive calibration program 132 determines that there are no tracks remaining to be checked ("no" branch, decision block 314), then adaptive calibration program 132 ends for this cycle.

Figure 4:
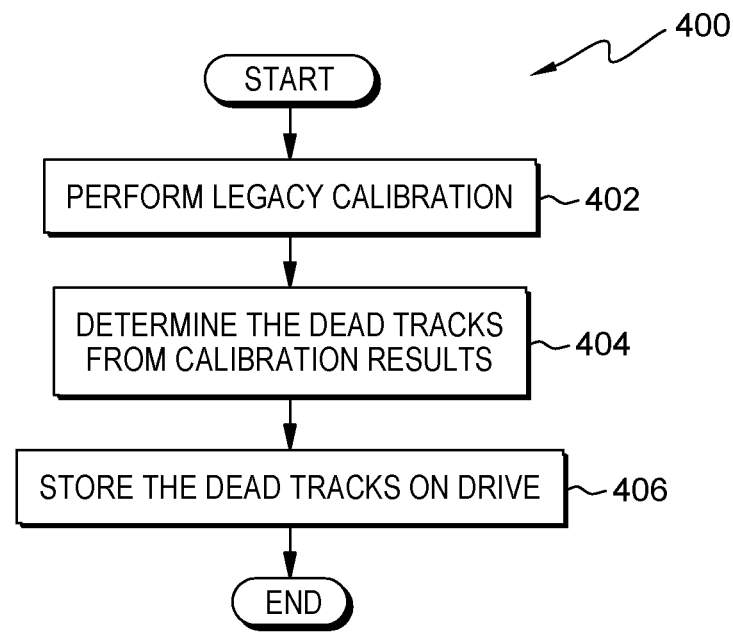
FIG. 4 is a flowchart depicting operational steps performed by the adaptive calibration program for storing information about a dead track during a calibration, on a magnetic tape device within the distributed data processing environment of FIG. 1, in accordance with an embodiment of the present invention.

FIG. 4 is a flowchart depicting operational steps performed by adaptive calibration program 132 for storing information about a dead track during a calibration, on a magnetic tape device within the distributed data processing environment of FIG. 1, in accordance with an embodiment of the present invention. In an alternative embodiment, the steps of workflow 400 may be performed by any other program while working with adaptive calibration program 132. In an embodiment, adaptive calibration program 132 performs a legacy calibration of the tape drive to determine the presence of any dead tracks on the tape drive. In an embodiment, adaptive calibration program 132 analyzes the results of the legacy calibration process to determine if there are any dead tracks on the tape drive. In an embodiment, adaptive calibration program then stores the head and track information in a non-volatile memory in the tape drive, e.g., the VPD. In an embodiment, adaptive calibration program 132 then ends for this cycle.

It should be appreciated that embodiments of the present invention provide at least for the operational steps performed by adaptive calibration program 112 for storing information about a dead track during a calibration. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 4 is illustrates one possible iteration of the operational steps performed by adaptive calibration program 112 for storing information about a dead track during a calibration, which repeats each time a calibration is performed by adaptive calibration program 132.

Adaptive calibration program 132 performs a legacy calibration (step 402). In an embodiment, adaptive calibration program 132 performs a legacy calibration of the tape drive to determine the presence of any dead tracks on the tape drive.

Adaptive calibration program 132 determines the dead tracks from calibration results (step 404). In an embodiment, adaptive calibration program 132 analyzes the results of the legacy calibration process to determine if there are any dead tracks on the tape drive. In an embodiment, adaptive calibration program 132 determines if there are any dead tracks on the tape drive by comparing the number of rewrites during calibration to the number of rewrites during calibration of a known good drive, as performed in FIG. 2 for write operation rewrites.

Adaptive calibration program 132 stores the dead tracks on the drive (step 406). In an embodiment, adaptive calibration program 132 then stores the head and track information in a non-volatile memory in the tape drive, e.g., the VPD. In an embodiment, adaptive calibration program 132 then ends for this cycle.

Figure 5:
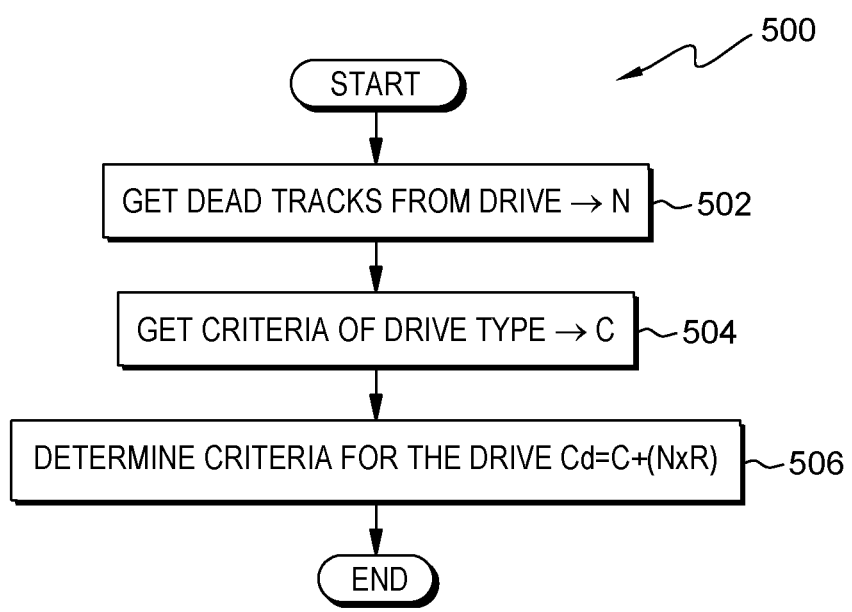
FIG. 5 is a flowchart depicting operational steps performed by the adaptive calibration program for determining a reference value for the number of rewrites to determine whether calibration should be performed, on a magnetic tape device within the distributed data processing environment of FIG. 1, in accordance with an embodiment of the present invention.

FIG. 5 is a flowchart depicting operational steps performed by adaptive calibration program 132 for determining a reference value for the number of rewrites to determine whether calibration should be performed, on a magnetic tape device within the distributed data processing environment of FIG. 1, in accordance with an embodiment of the present invention. In an alternative embodiment, the steps of workflow 500 may be performed by any other program while working with adaptive calibration program 132. In an embodiment, adaptive calibration program 132 retrieves the number of dead tracks from the memory in the tape drive, e.g., the main memory or the VPD, and stores this value in N. In an embodiment, adaptive calibration program 132 retrieves the criterion value for this drive type and stores the value in C. In an embodiment, adaptive calibration program 132 calculates the specific reference value for the specific drive, Cd. In an embodiment, adaptive calibration program 132 then ends for this cycle.

It should be appreciated that embodiments of the present invention provide at least for the operational steps performed by adaptive calibration program 132 for determining a reference value for the number of rewrites to determine whether calibration should be performed. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Adaptive calibration program 132 gets the dead tracks from drive→N (step 502). In an embodiment, adaptive calibration program 132 retrieves the number of dead tracks from the memory in the tape drive, e.g., the main memory or the VPD, and stores this value in N.

Adaptive calibration program 132 gets the criterion of drive type→C (step 504). In an embodiment, adaptive calibration program 132 retrieves the criterion value for this drive type and stores the value in C. In an embodiment, the criterion value is a reference value measured in advance for each type of drive that is used to determine whether calibration should be performed.

Adaptive calibration program 132 determines a criterion for the drive (step 506). In an embodiment, adaptive calibration program 132 calculates a specific reference value for the specific drive by taking the number of dead tracks into consideration. In an embodiment, adaptive calibration program 132 calculates the specific reference value for the specific drive, Cd, using formula (2).

$$Cd = C + (N \times R) \quad (2)$$

In an embodiment, adaptive calibration program 132 then ends for this cycle.

It should be appreciated that the embodiment described in FIG. 5 is just one simple method to determining a reference value for the number of rewrites to determine whether calibration should be performed when the number of rewrites increases linearly with the number of dead tracks. In another embodiment as described in FIG. 2, the number of rewrites may not increase linearly. In this alternate embodiment, the number of rewrites on a drive with dead tracks, $R_{dt}$, is measured for each track, and stored in a structure $R_{dt}(i)$, where i is the track number. The value $R_{dt}(i)$ would then be used on a track-by-track basis in step 506 to determine the reference number for each track individually.

Figure 6:
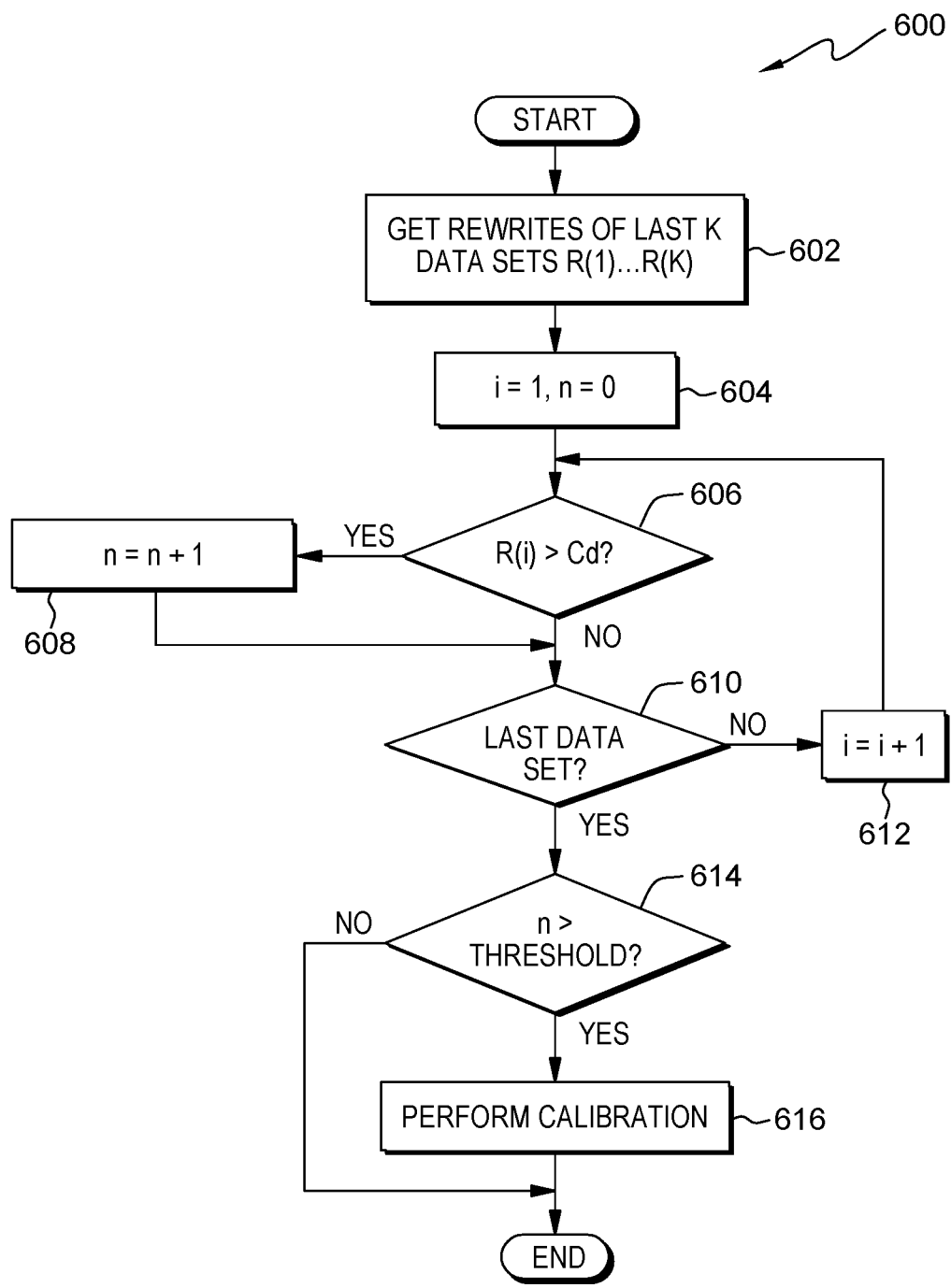
FIG. 6 is a flowchart depicting operational steps performed by the adaptive calibration program for determining whether calibration should be performed, on a magnetic tape device within the distributed data processing environment of FIG. 1, in accordance with an embodiment of the present invention.

FIG. 6 is a flowchart depicting operational steps performed by adaptive calibration program 132 for determining whether calibration should be performed, on a magnetic tape device within the distributed data processing environment of FIG. 1, in accordance with an embodiment of the present invention. In an alternative embodiment, the steps of workflow 600 may be performed by any other program while working with adaptive calibration program 132. In an embodiment, adaptive calibration program 132 retrieves the number of rewrites for the last K data set writes and stores them in R(1) through R(K). In an embodiment, adaptive calibration program 132 uses counter i to count the number of data sets, i.e., i counts from 1 to K, and n is used to count the total number of data sets where the number of rewrites exceeded a predetermined threshold. In an embodiment, adaptive calibration program 132 determines if the number of rewrites for data set i, i.e., R(i), exceeds a predetermined threshold Cd. In an embodiment, if adaptive calibration program 132 determines that the number of rewrites for data set i does exceed the predetermined threshold Cd, then adaptive calibration program 132 increments the count of the total number of data sets where the number of rewrites exceeded a predetermined threshold. In an embodiment, adaptive calibration program 132 determines whether the last data set has been analyzed, i.e., if i<K, then there are data sets remaining to analyze. In an embodiment, if adaptive calibration program 132 determines that the last data set has not been analyzed, then adaptive calibration program 132 increments the counter, i, to analyze the next data set. In an embodiment, adaptive calibration program 132 determines if the total count of all the data sets where the number of rewrites exceeded a threshold itself exceeds another predetermined threshold. In an embodiment, if adaptive calibration program 132 determines that the total count of all the data sets where the number of rewrites exceeded a threshold itself exceeds another predetermined threshold, then adaptive calibration program 132 performs a calibration. Adaptive calibration program 132 then ends for this cycle.

It should be appreciated that embodiments of the present invention provide at least for the operational steps performed by adaptive calibration program 132 for determining whether calibration should be performed. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 6 is illustrates one possible iteration of the operational steps performed by adaptive calibration program 132 for determining whether calibration should be performed, which repeats each time a calibration is set to be performed.

Adaptive calibration program 132 get the rewrites of last K data sets R(1) . . . R(K) (step 602). In an embodiment, adaptive calibration program 132 retrieves the number of rewrites for the last K data set writes and stores them in R(1) through R(K). In an embodiment, adaptive calibration program 132 retrieves the number of rewrites for the last K data set writes from the memory in the tape drive.

Adaptive calibration program 132 sets i=1, n=0 (step 604). In an embodiment, adaptive calibration program 132 uses counter i to count the number of data sets, i.e., i counts from 1 to K, and n is used to count the total number of data sets where the number of rewrites exceeded a predetermined threshold.

Adaptive calibration program 132 determines if R(i)>Cd (decision block 606). In an embodiment, adaptive calibration program 132 determines if the number of rewrites for data set i, i.e., R(i), exceeds a predetermined threshold Cd. In an embodiment, the predetermined threshold Cd is the reference value determined in FIG. 5. In an embodiment, if adaptive calibration program 132 determines the number of rewrites for data set i does not exceed the predetermined threshold Cd ("no" branch, decision block 606), then adaptive calibration program 132 proceeds to decision block 610 to check the next data set. In an embodiment, if adaptive calibration program 132 determines that the number of rewrites for data set i does exceed the predetermined threshold Cd ("yes" branch, decision block 606), then adaptive calibration program 132 proceeds to step 608 to increment the count of the total number of data sets where the number of rewrites exceeded a predetermined threshold.

Adaptive calibration program 132 sets n=n+1 (step 608). In an embodiment, if adaptive calibration program 132 determines that the number of rewrites for data set i does exceed the predetermined threshold Cd, then adaptive calibration program 132 increments the count, n, of the total number of data sets where the number of rewrites exceeded a predetermined threshold.

Adaptive calibration program 132 determines if this is the last data set (decision block 610). In an embodiment, adaptive calibration program 132 determines whether the last data set has been analyzed, i.e., if i<K, then there are data sets remaining to analyze. In an embodiment, if adaptive calibration program 132 determines that the last data set has not been analyzed ("no" branch, decision block 610), then adaptive calibration program 132 proceeds to step 612 to check the next data set. In an embodiment, if adaptive calibration program 132 determines that the last data set has been analyzed ("yes" branch, decision block 610), then adaptive calibration program 132 proceeds to decision block 614 to determine if the count of exceeded a predetermined threshold.

Adaptive calibration program 132 sets i=i+1 (step 612). In an embodiment, if adaptive calibration program 132 determines that the last data set has not been analyzed, then adaptive calibration program 132 increments the counter, i, to analyze the next data set. In an embodiment, adaptive calibration program 132 then returns to decision block 606 to check the next data set.

Adaptive calibration program 132 determines if n> a threshold (decision block 614). In an embodiment, adaptive calibration program 132 determines if the total count of all the data sets where the number of rewrites exceeded a threshold itself exceeds another predetermined threshold. In an embodiment, if adaptive calibration program 132 determines that the total count of all the data sets where the number of rewrites exceeded a threshold itself exceeds another predetermined threshold ("yes" branch, decision block 614), then adaptive calibration program 132 proceeds to step 616 to perform a calibration. In an embodiment, if adaptive calibration program 132 determines that the total count of all the data sets where the number of rewrites exceeded a threshold did not itself exceed another predetermined threshold ("no" branch, decision block 614), then adaptive calibration program 132 ends for this cycle.

Adaptive calibration program 132 performs a calibration (step 616). In an embodiment, if adaptive calibration program 132 determines that the total count of all the data sets where the number of rewrites exceeded a threshold itself exceeds another predetermined threshold, then adaptive calibration program 132 performs a calibration. Adaptive calibration program 132 then ends for this cycle.

In an embodiment, the rewrites, R, may be affected by debris on the tape head, and calibration would not be required. In an embodiment, if the debris can be removed, the number of rewrites would be improved up to the result calculated in FIG. 4 above, i.e., the rewrites determined during channel calibration. In an embodiment, if rewrites increase because of debris on the tape drive head, calibration is not required. In an embodiment, in order to remove the debris from the head, adaptive calibration program 132 runs the drive from the beginning of the tape (BOT) to the end of the tape (EOT) and runs back to the BOT. In an embodiment, adaptive calibration program 132 then re-checks the head by moving the head from operating position (cartridge is mounted to the tape drive) to lock position (cartridge is just inserted to the tape drive but not mounted), then moves back to the operating position. The sequence to remove debris is called refresh.

Figure 7:
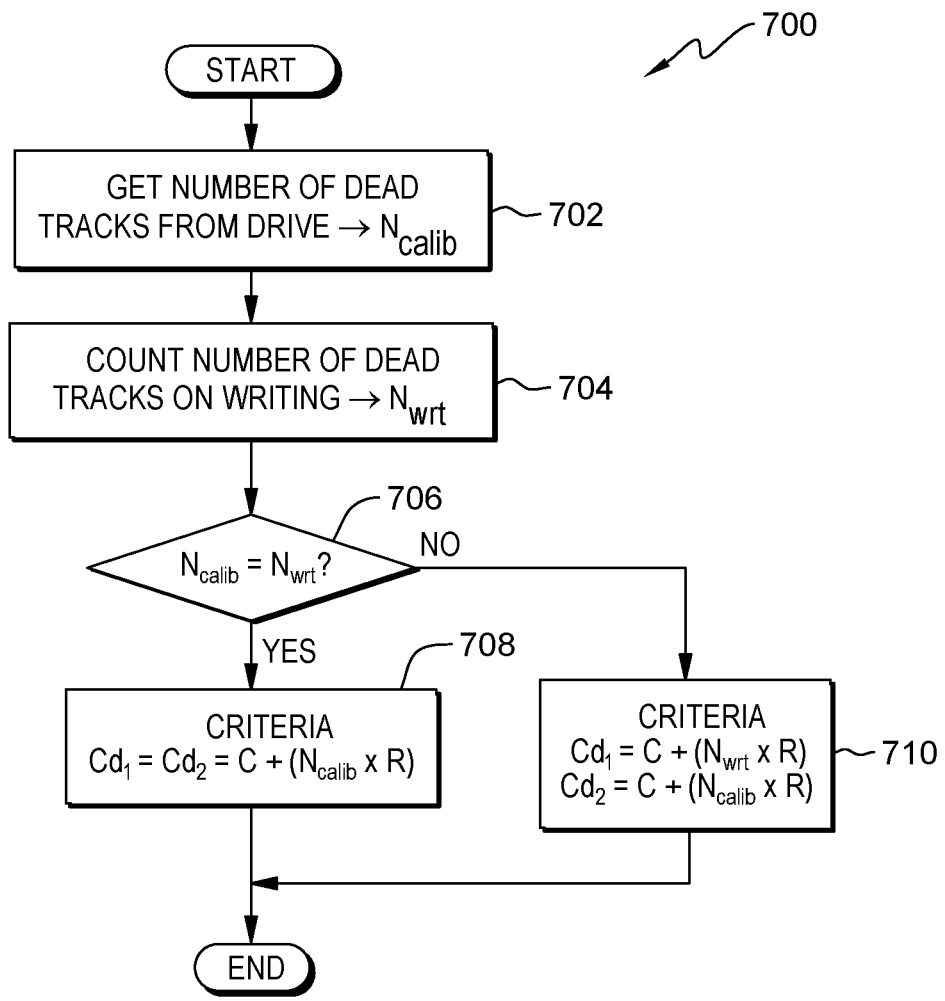
FIG. 7 is a flowchart depicting operational steps performed by adaptive calibration program 132 for determining a reference value for the number of rewrites to determine whether calibration or refresh should be performed, on a magnetic tape device within the distributed data processing environment of FIG. 1, in accordance with an embodiment of the present invention.
Figure 8:
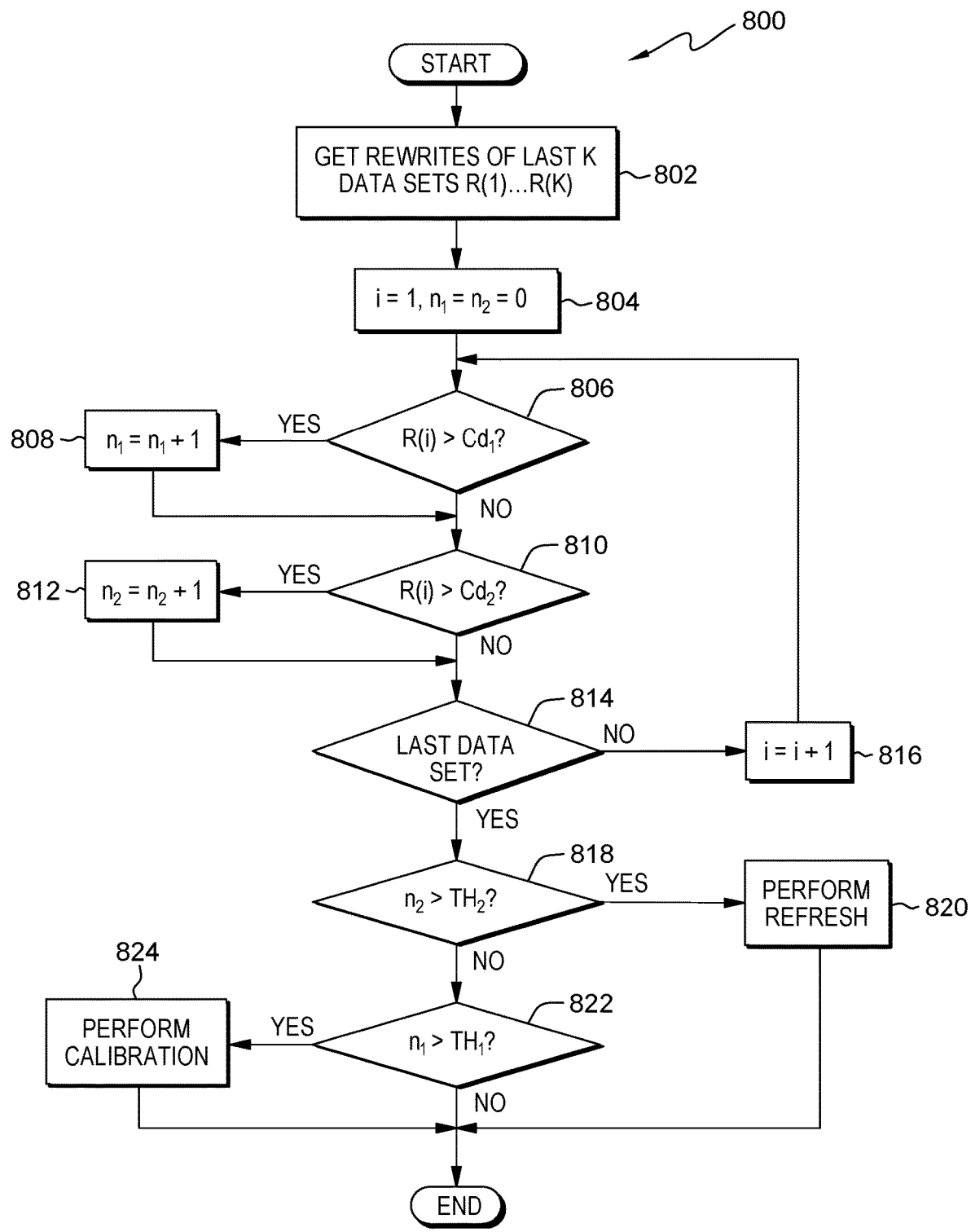
FIG. 8 is a flowchart depicting operational steps performed by the adaptive calibration program for determining whether calibration or refresh should be performed, on a magnetic tape device within the distributed data processing environment of FIG. 1, in accordance with an embodiment of the present invention.

FIG. 7 and FIG. 8 below describe an alternate embodiment of the present invention that includes the refresh function if debris is encountered on the tape.

In recent years, with the increase in capacity of tape drives, the area per bit (linear density times track width) when a tape drive writes to tape media has become extremely narrow. As a result, the presence of fine particles called debris adhering to the tape media or the head will increase the frequency of rewrite occurrences. When rewrite occurs due to debris, the frequency of rewrite may be reduced by removing the debris without actually performing calibration.

FIG. 7 is a flowchart depicting operational steps performed by adaptive calibration program 132 for determining a reference value for the number of rewrites to determine whether calibration or refresh should be performed, on a magnetic tape device within the distributed data processing environment of FIG. 1, in accordance with an embodiment of the present invention. In an alternative embodiment, the steps of workflow 700 may be performed by any other program while working with adaptive calibration program 132. In this embodiment, adaptive calibration program 132 determines whether debris is on the tape head. In the case where debris is not found on the tape head, then the adaptive calibration program 132 calculates a single criterion for a number of rewrites, $Cd_1$, to determine if a calibration is required. In the case where debris is found on the tape head, then the adaptive calibration program 132 calculates one criterion for a number of rewrites, $Cd_1$, to determine if a calibration is required, and a second criterion for a number of rewrites, $Cd_2$, to determine that a refresh is necessary to clean debris off the tape head.

In an embodiment, adaptive calibration program 132 retrieves the number of dead tracks from the non-volatile memory in the tape drive, e.g., the VPD, and stores this value in $N_{calib}$. In an embodiment, adaptive calibration program 132 counts the number of dead tracks encountered during a data write operation and stores this value in $N_{wrt}$. In an embodiment, adaptive calibration program 132 determines if the number of rewrites for a calibration, $N_{calib}$, is equal to the number of rewrites during a data write operation, $N_{wrt}$. In an embodiment, if adaptive calibration program 132 determines that the number of rewrites for a calibration, $N_{calib}$, is equal to the number of rewrites during a data write operation, $N_{wrt}$, then adaptive calibration program 132 calculates the criteria $Cd_1$ and $Cd_2$, which are the same in this case. In an embodiment, if adaptive calibration program 132 determines that the number of rewrites for a calibration, $N_{calib}$, is not equal to the number of rewrites during a data write operation, $N_{wrt}$, then adaptive calibration program 132 calculates two different criteria, $Cd_1$ and $Cd_2$. Adaptive calibration program 132 then ends for this cycle.

It should be appreciated that embodiments of the present invention provide at least for the operational steps performed by adaptive calibration program 132 for determining a reference value for the number of rewrites to determine whether calibration or refresh should be performed. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

Adaptive calibration program 132 gets the dead tracks from drive→$N_{calib}$ (step 702). In an embodiment, adaptive calibration program 132 retrieves the number of dead tracks from the non-volatile memory in the tape drive, e.g., the VPD, and stores this value in $N_{calib}$.

Adaptive calibration program 132 counts the number of dead tracks on writing→$N_{wrt}$ (step 704). In an embodiment, adaptive calibration program 132 counts the number of dead tracks encountered during a data write operation and stores this value in $N_{wrt}$. In an embodiment, adaptive calibration program 132 counts the number of dead tracks encountered during a data write operation as shown, for example, in FIG. 3 above.

Adaptive calibration program 132 determines if $N_{calib}=N_{wrt}$ (decision block 706). In an embodiment, adaptive calibration program 132 determines if the number of rewrites for a calibration, $N_{calib}$, is equal to the number of rewrites during a data write operation, $N_{wrt}$. If the number of rewrites for a calibration is not equal to the number of rewrites during a data write operation, then there is likely debris on the tape head, and a refresh operation may clear the debris and eliminate the additional rewrites.

In an embodiment, if adaptive calibration program 132 determines the number of rewrites for a calibration, $N_{calib}$, is not equal to the number of rewrites during a data write operation, $N_{wrt}$ ("no" branch, decision block 706), then adaptive calibration program 132 proceeds to step 710 to set two different criteria, one ($Cd_1$) to determine if a calibration is necessary, and one ($Cd_2$) to determine if a refresh is necessary. In an embodiment, if adaptive calibration program 132 determines that the number of rewrites for a calibration, $N_{calib}$, is equal to the number of rewrites during a data write operation, $N_{wrt}$ ("yes" branch, decision block 706), then adaptive calibration program 132 proceeds to step 708 to set a single criterion to determine only if a calibration is necessary.

Adaptive calibration program 132 creates the criteria $Cd_1=Cd_2=C+(N_{calib}\times R)$ (step 708). In an embodiment, if adaptive calibration program 132 determines that the number of rewrites for a calibration, $N_{calib}$, is equal to the number of rewrites during a data write operation, $N_{wrt}$, then adaptive calibration program 132 calculates the criteria $Cd_1$ and $Cd_2$, which are the same in this case, using formula (3).

$$Cd_1=Cd_2=C(N_{calib}\times R) \qquad (3)$$

In formula (3), C is a reference value for the specific drive type which is measured in advance for each type of drive and is used to determine whether calibration should be performed. R is the number of rewrites per dead track which was determined in FIG. 2 above. Adaptive calibration program 132 then ends for this cycle.

Adaptive calibration program 132 creates the criteria for calibration (step 710). In an embodiment, if adaptive calibration program 132 determines that the number of rewrites during a data write operation, $N_{wrt}$, is not equal to the number of rewrites for a calibration, $N_{calib}$, then adaptive calibration program 132 calculates two different criteria, $Cd_1$ and $Cd_2$, using formula (4) for $Cd_1$ and formula (5) for $Cd_2$.

$$Cd_1=C+(N_{wrt}\times R) \qquad (4)$$

$$Cd_2=C+(N_{calib}\times R) \qquad (5)$$

In both formula (4) and formula (5), as in formula (3), C is a reference value for the specific drive type which is measured in advance for each type of drive and is used to determine whether calibration should be performed. R is the number of rewrites per dead track which was determined in FIG. 2 above. The criteria $Cd_1$ and $Cd_2$ will be used in FIG. 8 to determine if a refresh should be performed, a calibration should be performed, or neither is required. Adaptive calibration program 132 then ends for this cycle.

FIG. 8 is a flowchart depicting operational steps performed by adaptive calibration program 132 for determining whether calibration or refresh should be performed, on a magnetic tape device within the distributed data processing environment of FIG. 1, in accordance with an embodiment of the present invention. In an alternative embodiment, the steps of workflow 800 may be performed by any other program while working with adaptive calibration program 132.

In an embodiment, adaptive calibration program 132 retrieves the number of rewrites for the last K data set writes and stores them in R(1) through R(K). In an embodiment, adaptive calibration program 132 uses counter i to count the number of data sets, i.e., i counts from 1 to K, $n_1$ is used to count the total number of data sets where the number of rewrites exceeded a predetermined threshold for a calibration cycle, and $n_2$ is used to count the total number of data sets where the number of rewrites exceeded a predetermined threshold for a data write operation. In an embodiment, adaptive calibration program 132 determines if the number of rewrites for data set i, i.e., R(i), exceeds a predetermined threshold $Cd_1$, which is the threshold for rewrites during a data write operation, i.e., the number of rewrites that will always occur on the track. In an embodiment, if adaptive calibration program 132 determines that the number of rewrites for data set i does exceed the predetermined threshold $Cd_1$, then adaptive calibration program 132 increments the count, $n_1$, of the total number of data sets where the number of rewrites during a data write operation exceeded the predetermined threshold. In an embodiment, adaptive calibration program 132 determines if the number of rewrites for data set i, i.e., R(i), exceeds a predetermined threshold $Cd_2$, which is a second threshold for rewrites for a calibration. In an embodiment, if adaptive calibration program 132 determines that the number of rewrites for data set i does exceed the predetermined threshold $Cd_2$, then adaptive calibration program 132 increments the count, $n_2$, of the total number of data sets where the number of rewrites for a calibration exceeded the predetermined threshold. In an embodiment, adaptive calibration program 132 determines whether the last data set has been analyzed, i.e., if i<K, then there are data sets remaining to analyze. In an embodiment, if adaptive calibration program 132 determines that the last data set has not been analyzed, then adaptive calibration program 132 increments the counter, i, to analyze the next data set. In an embodiment, adaptive calibration program 132 determines if the total count of all the data sets where the number of rewrites exceeded the threshold of rewrites during a write operation itself exceeds another predetermined threshold, $TH_2$. In an embodiment, if adaptive calibration program 132 determines that the total count of all the data sets where the number of rewrites exceeded the threshold of rewrites during a write operation itself exceeds $TH_2$, then adaptive calibration program 132 performs a refresh as described above. Adaptive calibration program 132 then ends for this cycle. In an embodiment, adaptive calibration program 132 determines if the total count of all the data sets where the number of rewrites exceeded the threshold of rewrites during a calibration itself exceeds another predetermined threshold, $TH_1$. In an embodiment, if adaptive calibration program 132 determines that the total count of all the data sets where the number of rewrites exceeded the threshold of rewrites during a calibration itself exceeds $TH_1$, then adaptive calibration program 132 performs a calibration. Adaptive calibration program 132 then ends for this cycle.

It should be appreciated that embodiments of the present invention provide at least for the operational steps performed by adaptive calibration program 132 for determining whether calibration or refresh should be performed. However, FIG. 8 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 8 is illustrates one possible iteration of the operational steps performed by adaptive calibration program 132 for determining whether calibration should be performed, which repeats each time a calibration is set to be performed.

Adaptive calibration program 132 get the rewrites of last K data sets R(1) . . . R(K) (step 802). In an embodiment, adaptive calibration program 132 retrieves the number of rewrites for the last K data set writes and stores them in R(1) through R(K). In an embodiment, adaptive calibration program 132 retrieves the number of rewrites for the last K data set writes from the memory in the tape drive.

Adaptive calibration program 132 sets i=1, $n_1=n_2=0$ (step 804). In an embodiment, adaptive calibration program 132 uses counter i to count the number of data sets, i.e., i counts from 1 to K, $n_1$ is used to count the total number of data sets where the number of rewrites exceeded a predetermined threshold for a data write operation, and $n_2$ is used to count the total number of data sets where the number of rewrites exceeded a predetermined threshold for a calibration.

Adaptive calibration program 132 determines if R(i)>$Cd_1$ (decision block 806). In an embodiment, adaptive calibration program 132 determines if the number of rewrites for data set i, i.e., R(i), exceeds a predetermined threshold $Cd_1$, which is the threshold for rewrites during a data write operation, i.e., the number of rewrites that will always occur on the track. In an embodiment, the predetermined threshold $Cd_1$ is one of the reference values determined in FIG. 7. In an embodiment, if adaptive calibration program 132 determines the number of rewrites for data set i does not exceed the predetermined threshold $Cd_1$ ("no" branch, decision block 806), then adaptive calibration program 132 proceeds to decision block 810 to check the next rewrite criteria. In an embodiment, if adaptive calibration program 132 determines that the number of rewrites for data set i does exceed the predetermined threshold $Cd_1$ ("yes" branch, decision block 806), then adaptive calibration program 132 proceeds to step 808 to increment the count of the total number of data sets where the number of rewrites during data write operation exceeded a predetermined threshold.

Adaptive calibration program 132 sets $n_1=n_1+1$ (step 808). In an embodiment, if adaptive calibration program 132 determines that the number of rewrites for data set i does exceed the predetermined threshold $Cd_1$, then adaptive calibration program 132 increments the count, $n_1$, of the total number of data sets where the number of rewrites during data write operation exceeded the predetermined threshold.

Adaptive calibration program 132 determines if R(i)>$Cd_2$ (decision block 810). In an embodiment, adaptive calibration program 132 determines if the number of rewrites for data set i, i.e., R(i), exceeds a predetermined threshold $Cd_2$, which is the threshold for rewrites for a calibration. In an embodiment, the predetermined threshold $Cd_2$ is one of the reference values determined in FIG. 7. In an embodiment, if adaptive calibration program 132 determines the number of rewrites for data set i does not exceed the predetermined threshold $Cd_2$ ("no" branch, decision block 806), then adaptive calibration program 132 proceeds to decision block 814 to check if this is the last data set. In an embodiment, if adaptive calibration program 132 determines that the number of rewrites for data set i does exceed the predetermined threshold $Cd_2$ ("yes" branch, decision block 806), then adaptive calibration program 132 proceeds to step 812 to increment the count of the total number of data sets where the number of rewrites exceeded a predetermined threshold for a calibration.

Adaptive calibration program 132 sets $n_2=n_2+1$ (step 812). In an embodiment, if adaptive calibration program 132 determines that the number of rewrites for data set i does exceed the predetermined threshold $Cd_2$, then adaptive calibration program 132 increments the count, $n_2$, of the total number of data sets where the number of rewrites for a calibration exceeded the predetermined threshold.

Adaptive calibration program 132 determines if this is the last data set (decision block 814). In an embodiment, adaptive calibration program 132 determines whether the last data set has been analyzed, i.e., if i<K, then there are data sets remaining to analyze. In an embodiment, if adaptive calibration program 132 determines that the last data set has not been analyzed ("no" branch, decision block 814), then adaptive calibration program 132 proceeds to step 816 to check the next data set. In an embodiment, if adaptive calibration program 132 determines that the last data set has been analyzed ("yes" branch, decision block 814), then adaptive calibration program 132 proceeds to decision block 818 to determine if the count of the total number of data sets where the number of rewrites during a write operation exceeded the predetermined threshold exceeded a predetermined threshold.

Adaptive calibration program 132 sets i=i+1 (step 816). In an embodiment, if adaptive calibration program 132 determines that the last data set has not been analyzed, then adaptive calibration program 132 increments the counter, i, to analyze the next data set. In an embodiment, adaptive calibration program 132 then returns to decision block 806 to check the next data set.

Adaptive calibration program 132 determines if $n_2>TH_2$ (decision block 818). In an embodiment, adaptive calibration program 132 determines if the total count of all the data sets where the number of rewrites exceeded the threshold of rewrites for a calibration itself exceeds another predetermined threshold, $TH_2$. In an embodiment, if adaptive calibration program 132 determines that the total count of all the data sets where the number of rewrites exceeded the threshold of rewrites for a calibration itself exceeds $TH_2$ ("yes" branch, decision block 818), then adaptive calibration program 132 proceeds to step 820 to perform a refresh. In an embodiment, if adaptive calibration program 132 determines that the total count of all the data sets where the number of rewrites exceeded the threshold of rewrites for a calibration did not itself exceed $TH_2$ ("no" branch, decision block 818), then adaptive calibration program 132 proceeds to decision block 822 to test the next threshold.

Adaptive calibration program 132 performs a refresh (step 820). In an embodiment, if adaptive calibration program 132 determines that the total count of all the data sets where the number of rewrites exceeded the threshold of rewrites for a calibration itself exceeds $TH_2$, then adaptive calibration program 132 performs a refresh as described above. Adaptive calibration program 132 then ends for this cycle.

Adaptive calibration program 132 determines if $n_1>TH_1$? (decision block 822). In an embodiment, adaptive calibration program 132 determines if the total count of all the data sets where the number of rewrites exceeded the threshold of rewrites during a data write operation itself exceeds another predetermined threshold, $TH_1$. In an embodiment, if adaptive calibration program 132 determines that the total count of all the data sets where the number of rewrites exceeded the threshold of rewrites during a data write operation itself exceeds $TH_1$ ("yes" branch, decision block 822), then adaptive calibration program 132 proceeds to step 824 to perform a calibration. In an embodiment, if adaptive calibration program 132 determines that the total count of all the data sets where the number of rewrites exceeded the threshold of rewrites during a data write operation did not itself exceed $TH_1$ ("no" branch, decision block 822), then adaptive calibration program 132 ends for this cycle.

Adaptive calibration program 132 performs a calibration (step 824). In an embodiment, if adaptive calibration program 132 determines that the total count of all the data sets where the number of rewrites exceeded the threshold of rewrites during a data write operation itself exceeds TH1, then adaptive calibration program 132 performs a calibration. Adaptive calibration program 132 then ends for this cycle.

Figure 9:
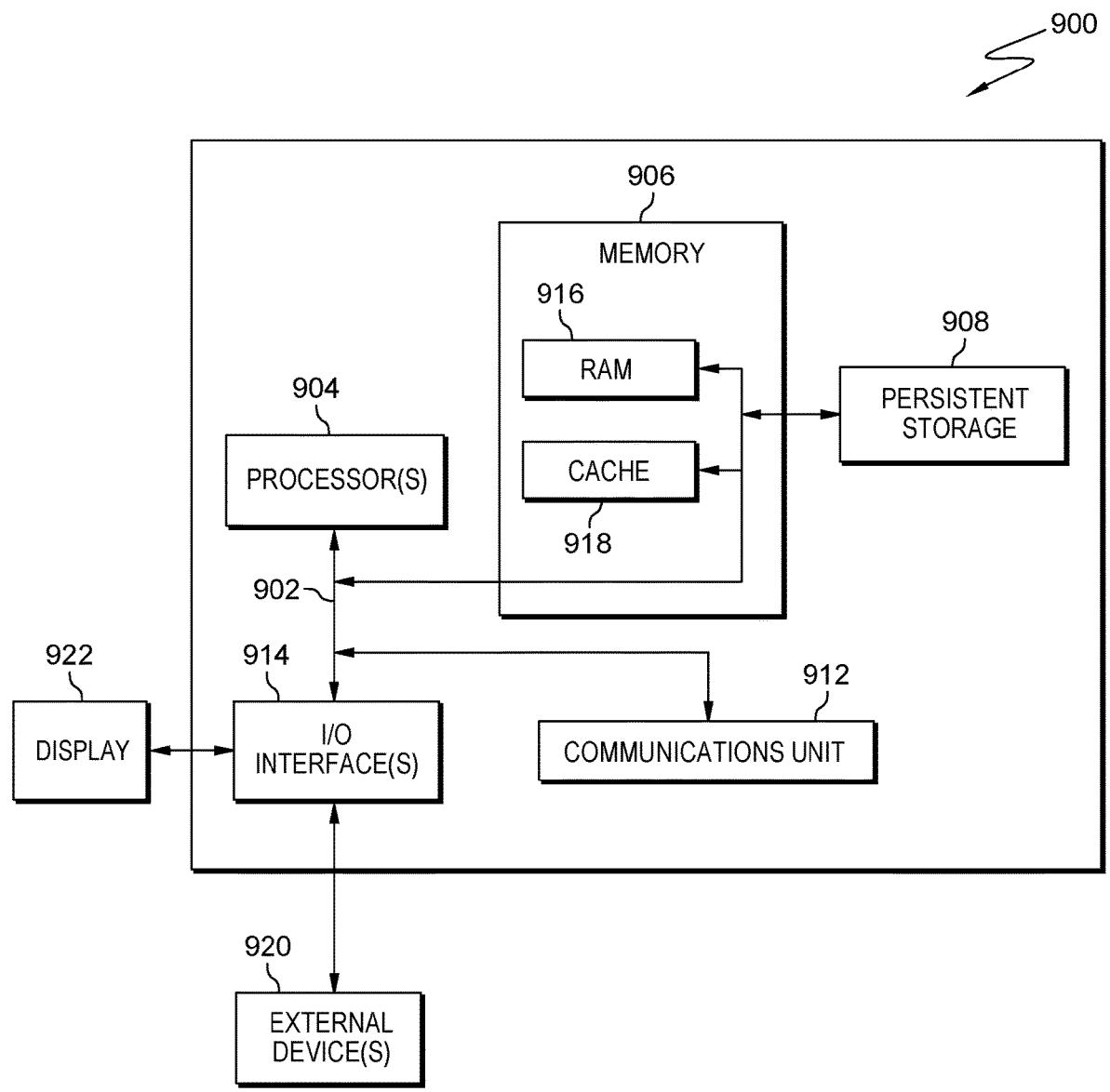
FIG. 9 depicts a block diagram of components of the magnetic tape device executing the adaptive calibration program within the distributed data processing environment of FIG. 1, in accordance with an embodiment of the present invention.

FIG. 9 is a block diagram depicting components of magnetic tape device 130 suitable for adaptive calibration program 132, in accordance with at least one embodiment of the invention. FIG. 9 displays computer 900; one or more processor(s) 904 (including one or more computer processors); communications fabric 902; memory 906, including random-access memory (RAM) 916 and cache 918; persistent storage 908; communications unit 912; I/O interfaces 914; display 922; and external devices 920. It should be appreciated that FIG. 9 provides only an illustration of one embodiment and does not imply any limitations with regard to the environments in which different embodiments may be implemented. Many modifications to the depicted environment may be made.

As depicted, computer 900 operates over communications fabric 902, which provides communications between computer processor(s) 904, memory 906, persistent storage 908, communications unit 912, and I/O interface(s) 914. Communications fabric 902 may be implemented with any architecture suitable for passing data or control information between processors 904 (e.g., microprocessors, communications processors, and network processors), memory 906, external devices 920, and any other hardware components within a system. For example, communications fabric 902 may be implemented with one or more buses.

Memory 906 and persistent storage 908 are computer readable storage media. In the depicted embodiment, memory 906 comprises RAM 916 and cache 918. In general, memory 906 can include any suitable volatile or non-volatile computer readable storage media. Cache 918 is a fast memory that enhances the performance of processor(s) 904 by holding recently accessed data, and near recently accessed data, from RAM 916.

Program instructions for adaptive calibration program 132 may be stored in persistent storage 908, or more generally, any computer readable storage media, for execution by one or more of the respective computer processors 904 via one or more memories of memory 906. Persistent storage 908 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. In the context of some embodiments of the present invention, the source of the various input data may be physically remote to computer 900 such that the input data may be received, and the output similarly transmitted via communications unit 912.

I/O interface(s) 914 allows for input and output of data with other devices that may be connected to computer 900. For example, I/O interface(s) 914 may provide a connection to external device(s) 920 such as a keyboard, a keypad, a touch screen, a microphone, a digital camera, and/or some other suitable input device. External device(s) 920 can also include portable computer readable storage media such as, for example, thumb drives, portable optical or magnetic disks, and memory cards. Software and data used to practice embodiments of the present invention, e.g., adaptive calibration program 132, can be stored on such portable computer readable storage media and can be loaded onto persistent storage 908 via I/O interface(s) 914. I/O interface(s) 914 also connect to display 922.

Display 922 provides a mechanism to display data to a user and may be, for example, a computer monitor. Display 922 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, a number of rewrite occurrences for each dead track of one or more dead tracks on a tape drive;
   responsive to detecting that a head is in a state of dead track, storing, by the one or more computer processors, a number of dead tracks on the tape drive;
   determining, by the one or more computer processors, a calibration threshold, wherein the calibration threshold includes a number of dead track rewrites and a calibration reference value for a specific tape drive type; and
   responsive to the number of rewrite occurrences exceeding the calibration threshold while writing a data set, performing, by the one or more computer processors, a calibration of the tape drive.

2. The computer-implemented method of claim 1, wherein determining the calibration threshold, wherein the calibration threshold includes the number of dead track rewrites and the calibration reference value for the specific tape drive type further comprises:
   retrieving, by the one or more computer processors, the number of dead tracks from the tape drive;
   determining, by the one or more computer processors, the number of dead track rewrites, wherein the number of dead track rewrites is determined by multiplying the number of dead tracks by the number of rewrite occurrences for each dead track on the tape drive; and
   adding, by the one or more computer processors, the number of dead track rewrites to the calibration reference value for the specific tape drive type.

3. The computer-implemented method of claim 1, wherein determining the number of rewrite occurrences for each dead track of the one or more dead tracks on the tape drive further comprises:
   measuring, by the one or more computer processors, a first number of rewrites on a dead track drive;
   measuring, by the one or more computer processors, a second number of rewrites on a good drive; and
   calculating, by the one or more computer processors, the number of occurrences of rewrite for each dead track, wherein the number of occurrences of rewrite for each dead track is calculated by subtracting the second number of rewrites on the good drive from the first number of rewrites on the dead track drive.

4. The computer-implemented method of claim 1, wherein the number of dead tracks is stored in a vital product data for the tape drive.

5. The computer-implemented method of claim 1, wherein the number of rewrite occurrences for each dead track of the one or more dead tracks on the tape drive is calculated for each tape drive type of one or more tape drive types.

6. A computer program product, the computer program product comprising one or more non-transitory computer readable storage media and program instructions stored on the one or more non-transitory computer readable storage media, the program instructions including instructions configured to:
   determine a number of rewrite occurrences for each dead track of one or more dead tracks on a tape drive;
   responsive to detecting that a head is in a state of dead track, store a number of dead tracks on the tape drive;
   determine a calibration threshold, wherein the calibration threshold includes a number of dead track rewrites and a calibration reference value for a specific tape drive type; and
   responsive to the number of rewrite occurrences exceeding the calibration threshold while writing a data set, perform a calibration of the tape drive.

7. The computer program product of claim 6, wherein determine the calibration threshold, wherein the calibration threshold includes the number of dead track rewrites and the calibration reference value for the specific tape drive type further comprises one or more of the following program instructions, stored on the one or more computer readable storage media, configured to:
   retrieve the number of dead tracks from the tape drive;

determine the number of dead track rewrites, wherein the number of dead track rewrites is determined by multiplying the number of dead tracks by the number of rewrite occurrences for each dead track on the tape drive; and add the number of dead track rewrites to the calibration reference value for the specific tape drive type.

8. The computer program product of claim 6, wherein determine the number of rewrite occurrences for each dead track of the one or more dead tracks on the tape drive further comprises one or more of the following program instructions, stored on the one or more computer readable storage media, configured to:

measure a first number of rewrites on a dead track drive;
measure a second number of rewrites on a good drive; and
calculate the number of occurrences of rewrite for each dead track, wherein the number of occurrences of rewrite for each dead track is calculated by subtracting the second number of rewrites on the good drive from the first number of rewrites on the dead track drive.

9. The computer program product of claim 6, wherein the number of dead tracks is stored in a vital product data for the tape drive.

10. The computer program product of claim 6, wherein the number of rewrite occurrences for each dead track of the one or more dead tracks on the tape drive is calculated for each tape drive type of one or more tape drive types.

11. A computer system, the computer system comprising:
one or more computer processors;
one or more computer readable storage media; and
program instructions stored on the one or more computer readable storage media for execution by at least one of the one or more computer processors, the stored program instructions including instructions configured to:
determine a number of rewrite occurrences for each dead track of one or more dead tracks on a tape drive;
responsive to detecting that a head is in a state of dead track, store a number of dead tracks on the tape drive;
determine a calibration threshold, wherein the calibration threshold includes a number of dead track rewrites and a calibration reference value for a specific tape drive type; and
responsive to the number of rewrite occurrences exceeding the calibration threshold while writing a data set, perform a calibration of the tape drive.

12. The computer system of claim 11, wherein determine the calibration threshold, wherein the calibration threshold includes the number of dead track rewrites and the calibration reference value for the specific tape drive type further comprises one or more of the following program instructions, stored on the one or more computer readable storage media, configured to:

retrieve the number of dead tracks from the tape drive;
determine the number of dead track rewrites, wherein the number of dead track rewrites is determined by multiplying the number of dead tracks by the number of rewrite occurrences for each dead track on the tape drive; and
add the number of dead track rewrites to the calibration reference value for the specific tape drive type.

13. The computer system of claim 11, wherein determine the number of rewrite occurrences for each dead track of the one or more dead tracks on the tape drive further comprises one or more of the following program instructions, stored on the one or more computer readable storage media, configured to:

measure a first number of rewrites on a dead track drive;
measure a second number of rewrites on a good drive; and
calculate the number of occurrences of rewrite for each dead track, wherein the number of occurrences of rewrite for each dead track is calculated by subtracting the second number of rewrites on the good drive from the first number of rewrites on the dead track drive.

14. The computer system of claim 11, wherein the number of dead tracks is stored in a vital product data for the tape drive.

15. The computer system of claim 11, wherein the number of rewrite occurrences for each dead track of the one or more dead tracks on the tape drive is calculated for each tape drive type of one or more tape drive types.

16. A computer-implemented method comprising:
determining, by one or more computer processors, a number of rewrite occurrences for each dead track of one or more dead tracks on a tape drive;
responsive to detecting that a head is in a dead track state, storing, by the one or more computer processors, a number of dead tracks on the tape drive;
determining, by the one or more computer processors, a first threshold and a second threshold, wherein the first threshold includes a number of dead track rewrites and a calibration reference value for a specific tape drive type, and further wherein the second threshold contains a number of calibration rewrites and the calibration reference value for the specific tape drive type;
responsive to the number of rewrite occurrences exceeding the first threshold while writing a data set, performing, by the one or more computer processors, a calibration of the tape drive; and
responsive to the number of rewrite occurrences exceeding the second threshold while writing the data set, performing, by the one or more computer processors, a refresh of the tape drive.

17. The computer-implemented method of claim 16, wherein determining the first threshold and the second threshold, wherein the first threshold includes the number of dead track rewrites and the calibration reference value for the specific tape drive type, and further wherein the second threshold contains the number of calibration rewrites and the calibration reference value for the specific tape drive type further comprises:

retrieving, by the one or more computer processors, the number of dead tracks from the tape drive;
determining, by the one or more computer processors, the number of dead track rewrites, wherein the number of dead track rewrites is determined by multiplying the number of dead tracks by the number of rewrite occurrences for each dead track on the tape drive; and
adding, by the one or more computer processors, the number of dead track rewrites to the calibration reference value for the specific tape drive type.

18. The computer-implemented method of claim 16, wherein determining the number of rewrite occurrences for each dead track of the one or more dead tracks on the tape drive further comprises:

measuring, by the one or more computer processors, a first number of rewrites on a dead track drive;
measuring, by the one or more computer processors, a second number of rewrites on a good drive; and
calculating, by the one or more computer processors, the number of occurrences of rewrite for each dead track, wherein the number of occurrences of rewrite for each dead track is calculated by subtracting the second number of rewrites on the good drive from the first number of rewrites on the dead track drive.

19. The computer-implemented method of claim 16, wherein the number of dead tracks is stored in a vital product data for the tape drive.

20. The computer-implemented method of claim 16, wherein the number of rewrite occurrences for each dead track of the one or more dead tracks on the tape drive is calculated for each tape drive type of one or more tape drive types.

21. A computer program product, the computer program product comprising one or more non-transitory computer readable storage media and program instructions stored on the one or more non-transitory computer readable storage media, the program instructions including instructions configured to:
- determine a number of rewrite occurrences for each dead track of one or more dead tracks on a tape drive;
- responsive to detecting that a head is in a dead track state, store a number of dead tracks on the tape drive;
- determine a first threshold and a second threshold, wherein the first threshold includes a number of dead track rewrites and a calibration reference value for a specific tape drive type, and further wherein the second threshold contains a number of calibration rewrites and the calibration reference value for the specific tape drive type;
- responsive to the number of rewrite occurrences exceeding the first threshold while writing a data set, perform a calibration of the tape drive; and
- responsive to the number of rewrite occurrences exceeding the second threshold while writing the data set, perform a refresh of the tape drive.

22. The computer program product of claim 21, wherein determine the first threshold and the second threshold, wherein the first threshold includes the number of dead track rewrites and the calibration reference value for the specific tape drive type, and further wherein the second threshold contains the number of calibration rewrites and the calibration reference value for the specific tape drive type further comprises one or more of the following program instructions, stored on the one or more computer readable storage media, configured to:
- retrieve the number of dead tracks from the tape drive;
- determine the number of dead track rewrites, wherein the number of dead track rewrites is determined by multiplying the number of dead tracks by the number of rewrite occurrences for each dead track on the tape drive; and
- add the number of dead track rewrites to the calibration reference value for the specific tape drive type.

23. The computer program product of claim 21, wherein determine the number of rewrite occurrences for each dead track of the one or more dead tracks on the tape drive further comprises one or more of the following program instructions, stored on the one or more computer readable storage media, configured to:
- measure a first number of rewrites on a dead track drive;
- measure a second number of rewrites on a good drive; and
- calculate the number of occurrences of rewrite for each dead track, wherein the number of occurrences of rewrite for each dead track is calculated by subtracting the second number of rewrites on the good drive from the first number of rewrites on the dead track drive.

24. The computer program product of claim 21, wherein the number of dead tracks is stored in a vital product data for the tape drive.

25. The computer program product of claim 21, wherein the number of rewrite occurrences for each dead track of the one or more dead tracks on the tape drive is calculated for each tape drive type of one or more tape drive types.

* * * * *